United States Patent
Gozdawa

(12) 
(10) Patent No.: US 6,398,658 B1
(45) Date of Patent: Jun. 4, 2002

(54) COMPOSITE SHAFT

(75) Inventor: Richard Julius Gozdawa, Middlesex (GB)

(73) Assignee: Corac Group Plc., British Body Corporate (GB)

( * ) Notice: Subject to any disclaimer, the term of this patent is extended or adjusted under 35 U.S.C. 154(b) by 0 days.

(21) Appl. No.: 09/463,813

(22) PCT Filed: Jul. 29, 1998

(86) PCT No.: PCT/GB98/02266
§ 371 (c)(1),
(2), (4) Date: Apr. 20, 2000

(87) PCT Pub. No.: WO99/06721
PCT Pub. Date: Feb. 11, 1999

(30) Foreign Application Priority Data

Jul. 30, 1997 (GB) .............................................. 9715951

(51) Int. Cl.$^7$ ................................................ F16C 3/00
(52) U.S. Cl. ...................... 464/179; 464/181; 403/408.1
(58) Field of Search ................................ 464/179, 181, 464/155, 51, 147; 403/408.1, 373, 374.2, 374.3

(56) References Cited

U.S. PATENT DOCUMENTS

| | | | |
|---|---|---|---|
| 1,636,262 A | * 7/1927 | Troendly | 403/359.5 |
| 4,312,193 A | * 1/1982 | Gibbs et al. | 464/147 |
| 4,485,545 A | 12/1984 | Caverly | |
| 4,557,704 A | 12/1985 | Ito et al. | |
| 4,773,891 A | * 9/1988 | Hoffmann | 464/181 |
| 5,226,791 A | 7/1993 | Miwa et al. | |
| 5,322,580 A | * 6/1994 | McIntire et al. | 464/181 |
| 5,342,464 A | * 8/1994 | McIntire et al. | 464/181 |

FOREIGN PATENT DOCUMENTS

| | | |
|---|---|---|
| GB | 839155 | 6/1960 |
| JP | 59 000595 | 1/1984 |
| JP | 60 056458 | 4/1985 |
| WO | WO 96 18047 | 6/1996 |

* cited by examiner

*Primary Examiner*—Lynne H. Browne
*Assistant Examiner*—Aaron M Dunwoody
(74) *Attorney, Agent, or Firm*—McNair Law Firm, P.A.; William D. Lee, Jr.; Cort Flint

(57) ABSTRACT

A composite shaft comprising at least two axial segments of dissimilar materials, the segments being held together by a central tie-bar, wherein a segment of material least subject to radial expansion is provided with a coaxial male member extending axially from its end, and the cooperating segment subject to greater radial expansion is provided with a female skirt shrunk onto the male member in the assembly of the shaft and also being provided with an annular upstand, at or towards its peripheral edge and directed towards the cooperating segment, the upstand being held by the compressive force of the tie-bar always in full annular contact with its cooperating segment. The male member is of smallest practicable diameter and the upstand is of largest practicable diameter.

11 Claims, 3 Drawing Sheets

COMPOSITE SHAFT

BACKGROUND OF INVENTION

This invention relates to a composite shaft of circular section which comprises two or more axial segments. In particular, the invention relates to a shaft in which at least one interface of adjacent segments is formed between segments which have different mechanical properties, thermal properties, or both.

The shaft may rotate and its temperature may change in the operation of the machine of which the shaft is a component. If at the interface of dissimilar segments the segments were unconstrained one with respect to the other then the radial displacements to one side of the interface due to thermal expansion or to centrifugal strain or to both would be different from the radial displacement to the other side.

In the following, two kinds of segment are differentiated by the fact that one kind has lesser expansion and the other kind has greater expansion, even though in practice, at an interface between the two kinds of segment their expansions may be constrained to be equal.

It is a requirement that the axial segments should remain sufficiently coaxial when the machine of which the shaft is a component goes through its operating cycles. The term sufficiently coaxial is defined as being coaxial to such an accuracy that a greater accuracy would not produce any change of practical importance in the behaviour in operation of the machine.

It cannot be relied upon that the sliding at their interface arising from the radial differential expansion between dissimilar segments will be axially symmetric and means to impose that symmetry have to be provided to ensure that the initial concentricity of the segments at their interface is not degraded by frictional ratcheting.

For that purpose and to resist other disturbing forces which might arise it is well known in the art to spigot similar or dissimilar segments together. With dissimilar segments the male member of the spigot is formed on the segment which will undergo less radial expansion in operation of the machine and the female member is bored to a lesser diameter than that of the male member. The segments are assembled by expanding the diameter of the female member for instance by heating that member so that the diameter of its bore in the hot condition is greater than or equal to the diameter of the male member in which instance the spigot is left pre-stressed on cooling. The pre-stress will decrease in operation of the machines. The initial pre-stress is calculated so that some pre-stress remains at all times in operation of the machine.

BRIEF SUMMARY OF THE INVENTION

An object of the present invention is to minimise the pre-stress which has to be imposed. This can be a particularly pertinent object when the segment of lesser radial expansion is of brittle material such as a ceramic.

According to the present invention there is provided a composite shaft comprising at least two axial segments of dissimilar materials, the segments being held together by a central tie-bar, wherein a segment of material least subject to radial expansion is provided with a coaxial male member extending axially from its end, and the cooperating segment subject to greater radial expansion is provided with a female skirt shrunk onto the male member in the assembly of the shaft and also being provided with an annular upstand, at or towards its peripheral edge and directed towards the cooperating segment, the upstand being held by the compressive force of the tie-bar always in full annular contact with its cooperating segment.

The male member may be of the smallest practicable diameter and the upstand may be of as large a diameter as possible.

The requirement that the segments should remain sufficiently coaxial at all times may be divided into two sub-requirements of firstly a requirement that at the interface of the segments there should be a sufficient stiffness against transverse shear and secondly that there should be a sufficient stiffness against bending. This division permits each sub-requirement to be satisfied by a distinct feature of a junction between dissimilar segments. The first sub-requirement can be satisfied at a relatively small diameter where the differential expansion to be contained is correspondingly small and the second at a larger diameter which is conducive to a high resistance to bending.

Embodiments of the invention will now be described, by way of example only, with reference to the accompanying drawings, in which:

DETAILED DESCRIPTION OF THE INVENTION

Figure 1:
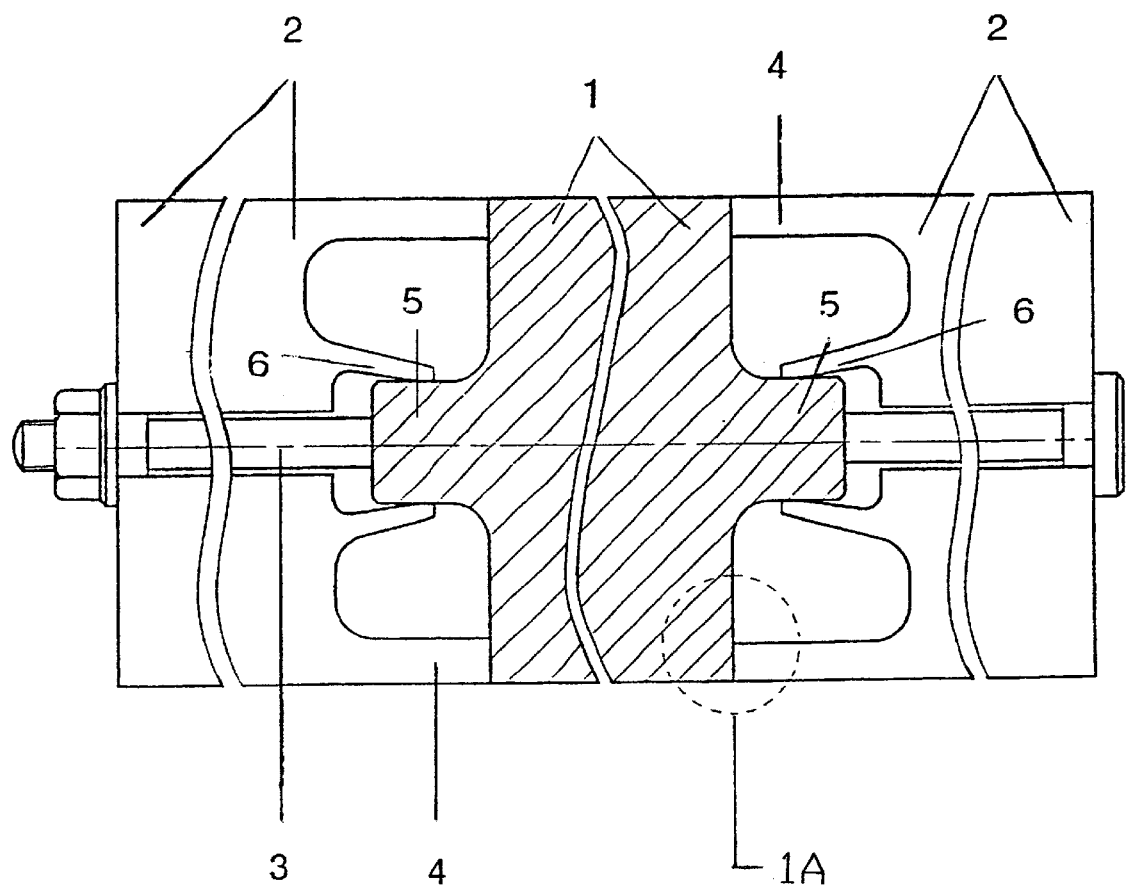
FIG. 1 shows schematically a shaft of three or more sections.
Figure 1A:
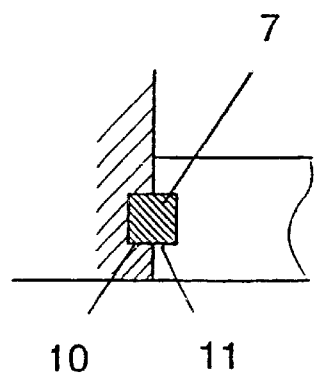
FIG. 2 shows schematically a part of an alternative embodiment and FIG. 1A is a magnified cross section of the area from which arrow A leads.

The invention will now be described with reference to FIG. 1 which illustrates a shaft of three or more segments in which of those segments 1 denotes a segment or segments which undergo the lesser radial expansion in operation whilst 2 denotes in diametral-axial section the partner segments which undergo the greater radial expansion in operation. 3 denotes a central tie-bar which is pre-stressed on the assembly of the shaft by at least such a degree as will maintain full annular contact of the segments by way of upstands 4 throughout the operation of the machine. 5 denotes a male member formed on the segments 1 and 6 denotes the cooperating female member formed on the segments 2. The diagram inset in FIG. 1 illustrates at 7 a button partly recessed in an upstand 4 and partly recessed in a segment 1.

A central longitudinal cavity is provided through the male member for the tie bar 3 to pass through. The least inner diameter of a male member in embodiments of the invention is determined by the diameter of the tie bar necessary to withstand the maximum compressive force to be exerted by the tie bar. The inner diameter of the male member may be no more than is required for easy assembly of the tie bar and the segments of the shaft. Taken together, the inner and outer diameters of a male member are the principal dimensions relating to the strength of a male member to withstand the forces to which it is subjected during assembly to its co-operating female member and in use. The outer diameter of a male member may be the least outer diameter required to ensure the integrity of the member during assembly and in operation.

The inner diameter of an upstand 4 may be as large as the diameters of the segments allow. It may also be as large as is compatible with the ability of the upstand to withstand the forces to which it is subject in the operation of the shaft.

Initially the female member is bored to such a lesser diameter than the diameter of the male member as will maintain some compression of the male member by the female member throughout the operation of the machine. By virtue of the invention the necessary difference in diameter between female bore and male member is minimised by forming both female and male members at diameters as small as is practically possible and by forming the female member as an extended skirt which, in comparison with the conventional recess of a spigot is more readily extensible radially whilst retaining a sufficient stiffness against transverse shear. In a preferred embodiment the skirt is formed with a tapered section and is bored slightly conically. For a constant radial compressive force per unit arc on the male member the purpose of the tapered section is to enhance shear stiffness and the purpose of the conical bore is to eliminate the heavy edge contact at the end of the male member which could occur on shrinking of the female member were a parallel bore in that member mated to a parallel male member. In an alternative design the heavy edge contact on shrinking of the female member may be eliminated by a tapered male member cooperating with a female member of parallel bore. In one application of the invention the segments 1 are of a ceramic material and provide the journals of slider bearings. With a ceramic material it is necessary to have regard to its propensity to brittle fracture and it is prudent to extend the male member axially so that there is unloaded material to each side of the band of compression on that member from the female member.

The segment(s) of lesser radial expansion may be of ceramic, whilst the segment(s) of greater radial expansion may be of a ductile material such as steel.

The shaft derives a sufficient stiffness in bending from the substantial upstands denoted by 4 in FIG. 1 being held always in full annular contact with the segments 1 by the compressive force exerted by the tie-bar 3. Radial sliding at the interfaces of the upstands with their cooperating segments 1 is to be allowed because the transverse shear stiffness provided by the male and female members makes the effect insignificant of any propensity to frictional ratcheting. To minimise friction the tie-bar 3 is tightened with a prudent margin to no more than is necessary to keep the upstands always in full annular contact with segments 1. Buttons, such as the button 7 illustrated in the diagram inset in FIG. 1 may be provided in a rotor application of the invention to prevent slip in rotation between an upstand and its cooperating segment 1 should friction be insufficient to transmit the demanded torque without slip. The buttons are fitted loosely so as not to inhibit differential radial expansion. In a preferred embodiment the buttons are made from a high temperature polymeric material. The buttons are provided in cooperating recesses 10, 11 in segment 1 and the upstand 4 of segment 2.

Figure 4:
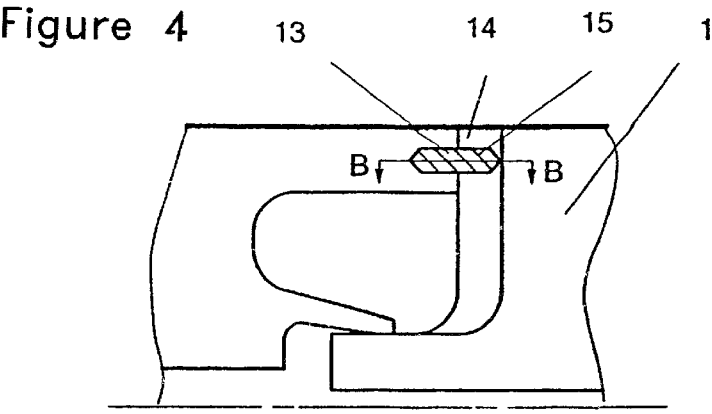
FIG. 4 shows an alternative drive arrangement.
Figure 4A:
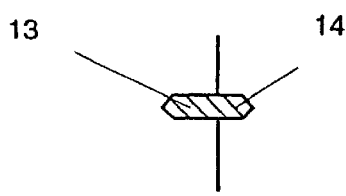
FIG. 4A is a partial section view along lines 30B.

The form of button shown in FIG. 1 may have the disadvantage, when segment 1 is of a brittle material, that stress concentrations created by the shallow drillings 11 may lead to fracture. An alternative form of drive is illustrated in FIG. 4, which may greatly reduce, the stress concentrations. The drive comprises a number of half round or rounded radial grooves 14 in a co-operating member 1 and associated shallow drillings 13 in the upstand. The buttons 15 have tails in the shallow drillings which retain them against centrifugal ejection and rounded heads projecting into grooves 13.

Figure 5:
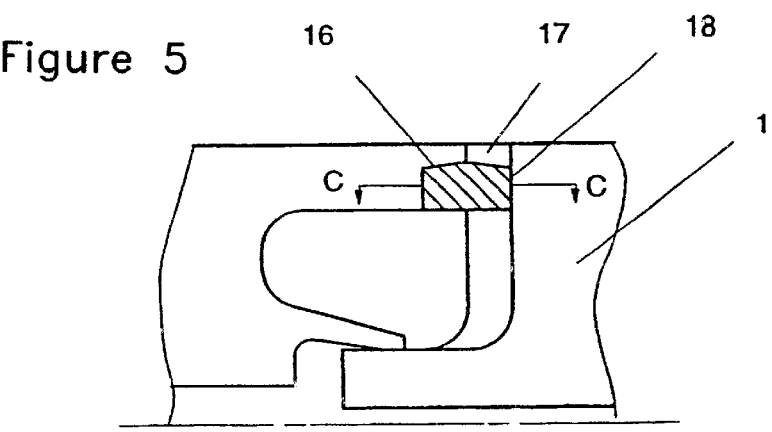
FIG. 5 shows a further alternative drive arrangement and FIG. 5A is a partial section view along lines C—C of FIG. 5.
Figure 5A:
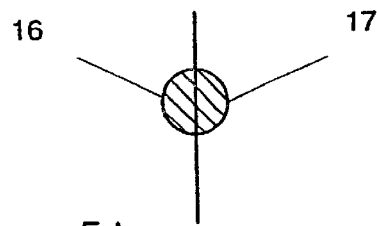

A further alternative form of drive is shown in FIG. 5 in which associated half round or rounded grooves 16,17 are provided in the co-operating member. The associated radial grooves are ended so that they do not break out into the outer cylindrical surface of the co-operating member so as to retain, against centrifugal force, radial keys 18 resting half in groove 16 and half in groove 17.

Other drive arrangements, including other keys/buttons, may alternatively or additionally be used.

Figure 2:
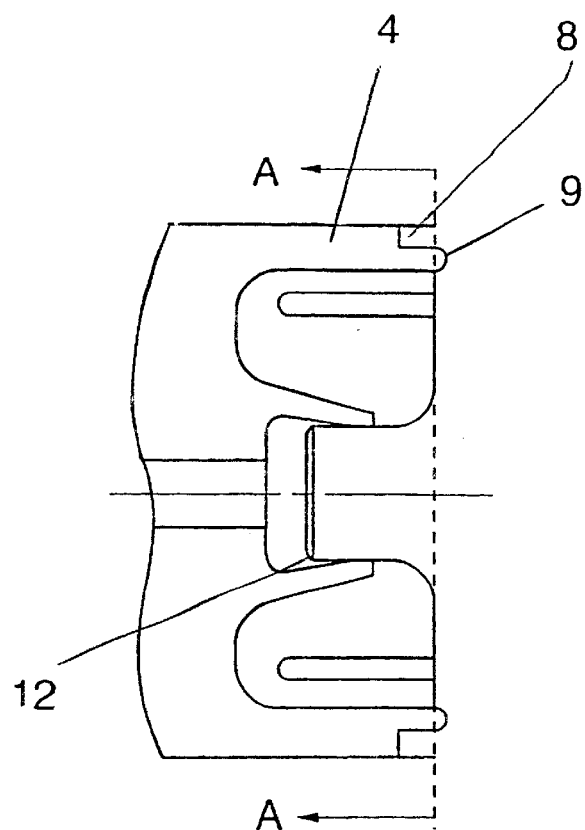
Figure 3:
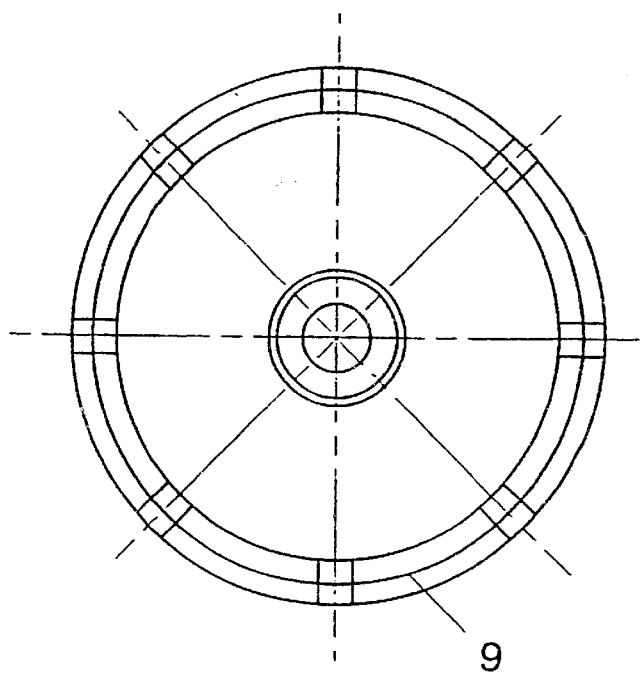
FIG. 3 shows a cross-section through A—A of FIG. 2.

FIGS. 2 and 3 illustrate an embodiment of the invention in which the upstands 4 of FIG. 1 are slit in radial-axial planes to form a number of fingers as is illustrated at 9 of FIGS. 2 and 3 and an outer rim 8 is formed in the segments 1. The fingers which are flexible in bending but stiff as struts are impelled radially outwards by centrifugal force in a rotor application of the invention and are restrained from flying radially outwards by the rim. The advantage of this embodiment is that radial sliding between the fingers of the upstand and segments 1 is eliminated because the fingers bend to accommodate the differential radial expansion. The rim has to be able to restrain the fingers without itself being fractured and that requirement may limit the allowable speed of such a design of rotor to a speed lesser than the maximum speed imposed by other considerations. As illustrated, the male member may have a bevelled edge 12 at its free end, to avoid chipping brittle material and cut fingers. A slight degree of coning may be used to ease assembly of the female to male member. The bevelled edge and/or coning of the male member may be used in other embodiments.

What is claimed is:

1. A composite shaft comprising at least two axial segments of dissimilar materials, the segments being held together by a central tie-bar, wherein a segment of material least subject to radial expansion is provided with a coaxial male member extending axially from its end, and the cooperating segment subject to greater radial expansion is provided with a female skirt shrunk onto the male member in the assembly of the shaft and also being provided with an annular upstand, at or towards its peripheral edge and directed towards the cooperating segment, the upstand being held by a compressive force of the tie-bar always in full annular contact with its cooperating segment.

2. A composite shaft as claimed in claim 1, wherein the male member is of smallest practicable diameter and the upstand is of largest practicable diameter.

3. A composite shaft as claimed in claim 1, wherein the female skirt is tapered with the taper towards its free end.

4. A composite shaft as claimed in claim 3, wherein the female skirt is bored slightlyconically with the diameter of the bore increasingly inwardly.

5. A composite shaft as claimed in claim 1, wherein the male member is tapered and the female member has a parallel bore.

6. A composite shaft as claimed in claim 1, wherein the male member is coned to a slightly smaller diameter at its free end.

7. A composite shaft as claimed in claim 1, wherein cooperating recesses are formed in the end face of an upstand and in its mating segment and a driving button or key is contained within the or each cooperating pair of recesses.

8. A composite shaft as claimed in claim 7, wherein the or each driving button or key is loosely fitted.

9. A composite shaft as claimed in claim 1, wherein the upstand is slitted in a plurality of radial-axial planes to divide the upstand into a number of fingers with the ends of the fingers constrained from outward radial movement by an outer rim formed on the mating segment of lesser radial expansion.

10. A composite shaft as claimed in claim 1, wherein the segment of lesser radial expansion is made from a brittle material and the segment of greater axial expansion is made from a ductile material.

11. A composite shaft as claimed in claim 1, wherein the segments are slit in the radial-axial planes to form a number of fingers adapted to be impelled radially outwards by the centrifugal force of a rotor.

* * * * *